UNITED STATES PATENT OFFICE.

WILLIAM ADAMSON AND CHARLES F. A. SIMONIN, OF PHILADELPHIA, PENNSYLVANIA, ASSIGNORS TO THE SAID ADAMSON.

IMPROVEMENT IN EXTRACTING SUGAR FROM SWEET POTATOES AND OTHER VEGETABLE SUBSTANCES.

Specification forming part of Letters Patent No. 125,249, dated April 2, 1872.

Specification describing an Improvement in Extracting Saccharine Matter, invented by WILLIAM ADAMSON and CHARLES F. A. SIMONIN, of Philadelphia, Pennsylvania.

*Improvement in Extracting Saccharine Matter.*

Our invention consists in extracting saccharine matter from saccharine-bearing vegetables, fruits, &c., by first subjecting the same to the action of hydrocarbon vapors, and afterward to a leaching or filtering process, as described hereafter, the preliminary hydrocarbon treatment rendering the extraction by filtration easy of accomplishment.

We have ascertained that after treating with hydrocarbon vapors such vegetable substances as contain saccharine matter the latter can be very readily extracted by leaching or filtration. From the ordinary sweet potato, for instance, we have succeeded in obtaining good sirup. We prefer to crush or cut into slices or otherwise disintegrate the roots and then subject them to the action of hydrocarbon vapor, which may be accomplished in different ways and by different appliances—for instance, apparatus substantially like that described in the patent granted to Lewis S. Robins March 26, 1868, for extracting oily and fatty matters, reissued October 3, 1871, might be employed; or the apparatus described in William Adamson's patent No. 117,135, for extracting resins, &c., granted July 18, 1871; or that described in William Adamson's patent No. 118,668, for treating animal and vegetable substances, granted September 5, 1871. We prefer the latter apparatus, as the vegetable can be subjected therein to hydrocarbon vapors under a determinate pressure, and as the vapor after acting on the vegetables can be condensed and re-used, so that there is little or no waste of hydrocarbon. The hydrocarbon has the effect of completely desiccating the vegetable, without, however dislodging the saccharine matter, which, however, is in a condition to be easily removed by leaching or filtration. After the hydrocarbon treatment the slices of potatoes are crisp and friable, and after exposure to heat, or to the atmosphere, or by soaking, will lose nearly all traces of the hydrocarbon, and may be granulated prior to the leaching process. Boiling water may be poured over the granulated mass in a vessel, and the saccharine matter, owing to the preliminary hydrocarbon treatment, being exposed to the influence of the water, will be taken up by the latter, and the result of the evaporation of the solution will be a rich sirup or molasses.

Parsnips, beet-root, and other roots containing saccharine matter, as well as pumpkins and other fruits, and even sugar-cane, may be treated in the manner described.

One great advantage of this treatment is that the loss of saccharine matter by fermentation, when it is extracted in the usual manner, is in a great measure prevented, for the tendency of the solution obtained after the hydrocarbon treatment to ferment is by no means so great as that of the saccharine juices expressed directly from the vegetables in the usual manner.

We prefer, in carrying out our invention, to employ light and volatile hydrocarbon, such as benzine, benzole, gasoline, or naphtha.

As to the length of time to which the saccharine-bearing vegetable matter should be subjected to the hydrocarbon-vapor treatment, that will be depend in a great measure upon the character of the vegetables treated and on the pressure employed; it may be remarked, however, that we have completely desiccated sweet potatoes and reduced them to a proper condition for the filtering process by subjecting them to hydrocarbon vapor under pressure of from thirty to sixty pounds per square inch for eight hours.

We do not desire, however, to restrict ourselves either to any specific appliances, or to any determinate pressure of hydrocarbon vapor, or to any definite duration of time during which the treatment should be continued; but

We claim as our invention—

The extracting of saccharine matter from vegetables, fruits, &c., substantially in the manner described.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.